3,136,702
PROCESS FOR PRODUCING L-GLUTAMIC ACID
Shinji Okumura, Yokohama-shi, Kanagawa-ken, Ryuichiro Tsugawa, Tokyo, Toshinao Tsunoda, Zushi-shi, Kanagawa-ken, and Kageaki Kono, Tokyo, Japan, assignors to Ajinomoto Co., Inc. and Sanraku Distillers Co., Inc., Tokyo, Japan
No Drawing. Filed July 19, 1962, Ser. No. 211,125
Claims priority, application Japan July 19, 1961
7 Claims. (Cl. 195—47)

The present invention relates to a process for the production of L-glutamic acid, and more particularly to improvements in the large-scale bacterial fermentation of carbohydrates to form L-glutamic acid in a culture medium.

It is known that certain microorganisms can metabolize carbohydrates to produce L-glutamic acid. Among the numerous species of bacteria capable of such action are certain species from the genera Bacillus, Micrococcus, Brevibacterium, Corynebacterium and Microbacterium. These bacteria can produce and accumulate L-glutamic acid only when the aqueous culture medium contains some amounts of biotin as well as a carbon source, a nitrogen source, certain inorganic salts and additional nutrients.

Suitable known carbon sources include substantially pure sugars, such as glucose, fructose, maltose and sucrose, but also such mixtures as starch hydrolyzates. Syrup containing sugar, crude sugar or molasses of beet and cane, crushed rice hydrolyzate, soybean extracts, beans and other cereals, which are cheap and available in large amounts, may also be used as carbon sources. However, they generally contain too much biotin to produce and accumulate L-glutamic acid in a culture medium, wherefor they may not be used without first decreasing their biotin content. For instance, molasses contain biotin or the like in the range of 10–1000γ per 100 grams of sugar, while the aqueous culture media for producing glutamic acid should contain biotin in the range of 3–6γ per 100 grams of saccharide material.

It is an object of this invention to make possible the use of these cheap materials, which contain an excessive amount of biotin, as a carbon source for producing L-glutamic acid by fermentation. The term "excessive amount" covers any amount of biotin in excess of about 6γ/100 g. of saccharide material, as used herein.

We have found that some species of bacteria, yeasts, fungi and actinomycetes decompose and/or absorb biotin and the like when these microorganisms are contacted with a solution containing an excessive amount of biotin. This saccharide solution may then be used for any of the known processes for producing L-glutamic acid by fermentation.

Accordingly, a microorganism capable of decomposing and/or absorbing biotin is contacted with a saccharide material containing biotin in an excessive amount, and a microorganism capable of producing L-glutamic acid is cultured in a nutrient medium containing a carbon source obtained from this saccharide material and an assimilable nitrogen source, while the medium is agitated under aerobic conditions. L-glutamic acid is recovered from the culture medium.

Microorganisms capable of decomposing and/or absorbing biotin will be termed "capable of removing biotin" in the claims.

The contacts between the biotin-removing microorganisms and the saccharide material will be maintained until the biotin content has been reduced to 3–6γ/100 g. of the material.

The saccharide solutions, e.g. a syrup containing sugar, crude sugar, molasses of beet or cane, crushed rice-hydrolyzate or soybean extracts, are prepared in a concentration range from about 5% to about 30%, by weight, of carbohydrate, Microorganisms capable of decomposing and/or absorbing biotin are added to the solution in the form of a culturing broth or in the form of living cells. The cell extracts are also usable. The biotin removing reaction is carried out in a pH range from about 4 to about 12, at a temperature between 20° C. and 50° C., while the solution is mildly agitated under slightly aerobic conditions. The reaction is ordinarily complete within 10 hours. The resultant reaction mixture may then be supplied to an L-glutamic acid fermentation broth after removing solid matter therefrom or inactivating any enzyme therein.

Any microorganisms capable of decomposing and/or absorbing biotin can be used in preparing the carbon source in the process of the present invention.

Any microorganisms capable of producing L-glutamic acid from carbon compounds and nitrogen compounds can be used in the process of the present invention. The following are preferred for the industrial production of L-glutamic acid: species belonging to the genus Bacillus, such as *Bacillus megaterium*, *Bacillus subtilis*, *Bacillus circulans*, *Bacillus cereus*; species *Escherichia coli*; species belonging to the genus Micrococcus, such as *Micrococcus varians*, and species belonging to the genus Brevibacterium, such as *Brevibacterium lactofermentum* (for example ATCC Nos. 13655 and 13869, *Brevibacterium kawasakii*, *Brevibacterium devaricatum*, *Brevibacterium aminogenes* and *Brevibacterium saccharolyticum* (for example ATCC No. 14066).

In this specification, the term "biotin" is used to designate cis-hexahydro-2-oxo-H-thieno-3,4-imidazole-4-valeric acid, and "the like" designates a substance which has the same function as biotin.

The following examples illustrate the invention:

*Example 1*

An aqueous beet molasses soluton (glucose equivalent: 10 grams per 100 ml.; biotin: 25γ per liter) was inoculated with *Saccharomyces bisporus* IAM–4226 (ATCC No. 14749) and cultured at 31° C. for 21 hours while shaking. 5 ml. of this solution was added to 50 ml. of the original beet molasses solution and permitted to react therewith for 5 hours at 31° C. while the culture was being shaken in a 500 ml. shaking flasks. The culture was then filtered.

20 milliliters of a culture medium was prepared in a 500 ml. glass flask with the filtrate obtained and minor amounts of additive agents. The medium had the following composition:

Sucrose (glucose equivalent) _ 10 grams per 100 ml.
$KH_2PO_4$ _____ 0.1 gram per 100 ml.
$MgSO_4$ _____ 0.04 gram per 100 ml.
$Fe^{++}$ ions _____ 2 p.p.m.
$Mn^{++}$ ions _____ 2 p.p.m.
Vitamin $B_1$-HCl _____ 200 micrograms per liter.
Soybean hydrolyzate _____ 0.1 ml. per 100 ml.

The hydrogen ion concentration of the culture medium was adjusted to a pH of 7.8 by the addition of an aqueous urea solution, and the medium was inoculated with *Brevibacterium lactofermentum* No. 2256 (ATCC No. 13689), and cultured at 31° C. for 45 hours while shaking. Its pH was maintained in the range of 7–9.

The fermentation mixture contained 3.61 grams glutamic acid per 100 ml. The liquid portion of the culture was separated from the solids which contained most of the microorganisms, was further clarified by centrifuging, acidified to a pH of 3.2, and permitted to crystallize. The L-glutamic acid weighed 0.56 gram.

*Example 2*

A biotin removing reaction was carried out in the manner as described in Example 1 by using the Torula sp. IAM (ATCC No. 14750). From the filtrate of the reaction, a culture medium was prepared in the manner described in Example 1 and L-glutamic acid fermentation was carried out.

The amount of L-glutamic acid in the fermented medium was 3.88 grams per 100 milliliters. The amount of L-glutamic acid recovered by crystallization was 0.64 gram.

*Example 3*

Cells of *Brevibacterium lactofermentum* strain No. 2256 (ATCC No. 13869) were collected from 100 ml. of a broth, produced as a result of L-glutamic acid fermentation using microorganisms of *Brevibacterium lactofermentum* strain No. 2256 and containing L-glutamic acid in the concentration 5.8 g./dl. The thus obtained cells were suspended in 10 ml. of water. Two ml. of the suspension was added to 50 ml. of beet molasses, as in Example 1, and the biotin removing reaction was carried out for 2 hours at 31° C. with mild agitation. After the reaction, the concentration of biotin and saccharide material was $0.05\gamma$/l. (by the bioassay using *Lactobacillus arabinosus*) and 9.6 g./dl., respectively. Inorganic salts, thyamin hydrochloride and soybean hydrolyzate were added to the thus obtained saccharide containing solution, the solution was poured into a shaking flask of 20 ml. volume and finally sterilized. After the medium was innoculated with *Brevibacterium lactofermentum* strain No. 2256 and an aqueous solution of urea and 7,8-diamino-pelargonic acid dihydrochloride (in the concentration $30\gamma$/l.) was added, L-glutamic acid fermentation was carried out. L-glutamic acid was accumulated in the concentration of 4.2 g./dl. in the fermentation broth.

*Example 4*

A biotin removing reaction was carried out for 5 hours as in Example 3, except that a solution of hard brown sugar produced in the Philippines (containing biotin and sugar in the concentrations of $27.5\gamma$/l. and 10.5%, respectively, and having a pH value of 7.5) was used as raw material instead of beet molasses. After the reaction, the concentration of biotin and sugar was $9.3\gamma$/l. and 9.6 g./dl., respectively (biotin was analyzed using *Lactobacillus arabinous*). Inorganic salts, thyamin hydrochloride and soybean hydrolyzate was added to the solution, as in Example 1, and L-glutamic acid fermentation was carried out. L-glutamic acid was accumulated in the concentration of 1.7 g./dl. in the broth, and 12 g. of crude L-glutamic acid was obtained from 1 liter of broth. When hard brown sugar was used as carbon source for L-glutamic acid fermentation without the biotin removing reaction, the accumulation of L-glutamic acid was 0.2% based on used sugar because of the large amount of biotin in it.

*Example 5*

The clarified solution, which was prepared from hard brown sugar by the biotin removing reaction of Example 4, was mixed with sweet potato starch hydrolyzate obtained by the action of an equal amount of acid. The mixture was adjusted to a sugar concentration of 10%, then L-glutamic acid fermentation was carried out, as in Example 1. L-glutamic acid was accumulated in the concentration of 4.5 g./dl. in the broth, and 38 g. of crude L-glutamic acid was recovered from 1 liter of said broth.

Obviously, any saccharide material containing an excess of biotin may be substituted in the above examples, as may be any microorganisms of the indicated types, which will serve the indicated functions, which are well known in the art.

While the invention has been described in connection with certain and specific embodiments, it will be clearly understood that many variations and modifications may occur to the skilled in the art, particularly after benefiting from the present teaching, without departing from the spirit and scope of this invention as defined in the appended claims.

What we claim is:

1. A process for the production of L-glutamic acid, which comprises contacting microorganisms selected from the group consisting of *Saccharomyces bisporus*, Torula sp. ATCC No. 14750, and *Brevibacterium lactofermentum*, and capable of removing biotin with a saccharide material containing biotin in excessive amounts until the content of biotin has been reduced to no more than about $6\gamma/100$ g. of the saccharide material, culturing microorganisms capable of producing L-glutamic acid in a nutrient medium containing a carbon source constituted by the saccharide material thus obtained and an assimilable nitrogen source, while agitating the medium under aerobic conditions, and recovering L-glutamic acid from the culture medium.

2. The process defined in claim 1, wherein said first-named microorganisms are selected from the group consisting of *Saccharomyces bisporus* ATCC No. 14749, and *Brevibacterium lactofermentum* ATCC Nos. 13655 and 13869.

3. The process defined in claim 1, wherein said first-named microorganisms are also capable of producing L-glutamic acid, being gram-positive and requiring biotin for culturing.

4. The process defined in claim 1, wherein said first-named microorganisms are contacted with the saccharide material in an aqueous solution having a pH range between about 4 and about 12.

5. The process defined in claim 1, wherein said first-named microorganism is contacted with the saccharide material at a temperature between about 20° C. and about 50° C.

6. The process defined in claim 1, wherein said saccharide material is selected from the group consisting of a syrup containing sugar, crude sugar, molasses, crushed rice hydrolyzate, soybean extracts and a cereal hydrolyzate.

7. The process defined in claim 1, wherein said first-named microorganisms comprise cells separated from the L-glutamic acid culture medium.

References Cited in the file of this patent

UNITED STATES PATENTS 3,002,889    Kinoshita et al. _____ Oct. 3, 1961

OTHER REFERENCES

Chao et al.: Journal of Bacteriology 77, 715–725 (page 720 particularly relied upon).